No. 11,961. Reissued Jan. 21, 1902.
J. L. CREVELING.
MEANS FOR DRIVING DYNAMOS FROM CAR AXLES.
(Application filed Sept. 23, 1901.)
2 Sheets—Sheet 1.
Fig. I.
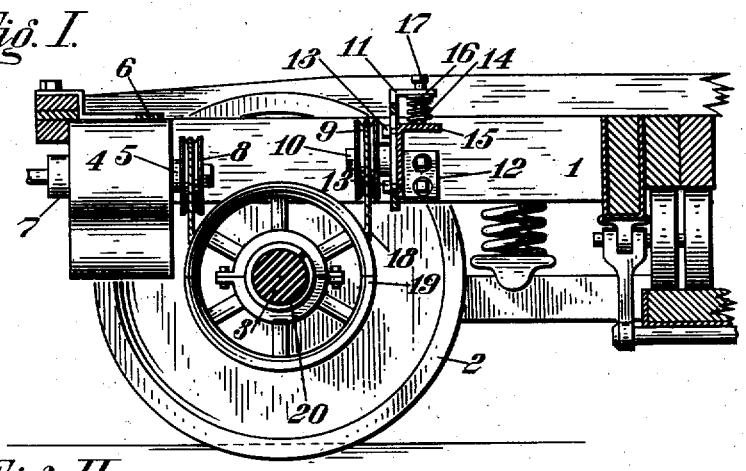
Fig. II.
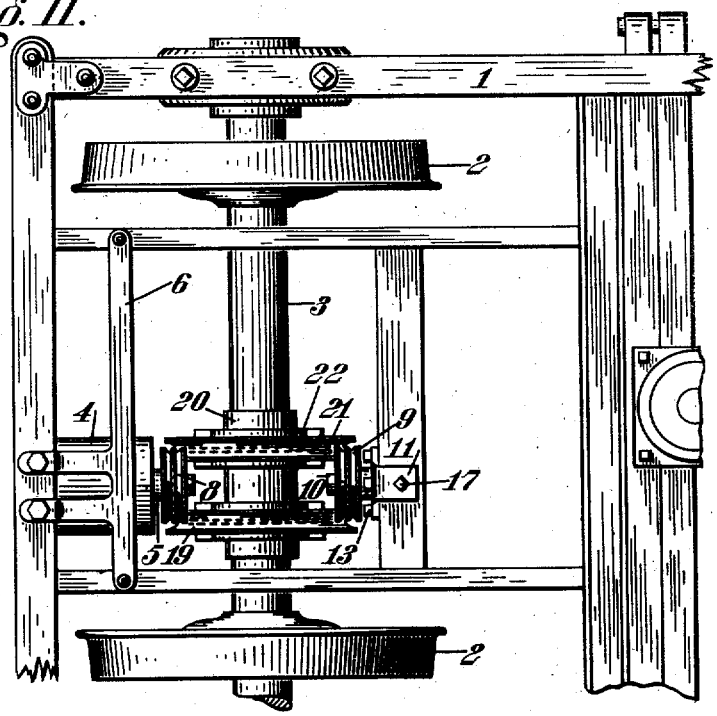
WITNESSES:
Lindsley Schepmoes
Conrad Kramp
INVENTOR:
John L. Creveling
By
Kennison Crain Emley & Rubin
his attorneys No. 11,961. Reissued Jan. 21, 1902.
J. L. CREVELING.
MEANS FOR DRIVING DYNAMOS FROM CAR AXLES.
(Application filed Sept. 23, 1901.)
2 Sheets—Sheet 2.
Fig. III.
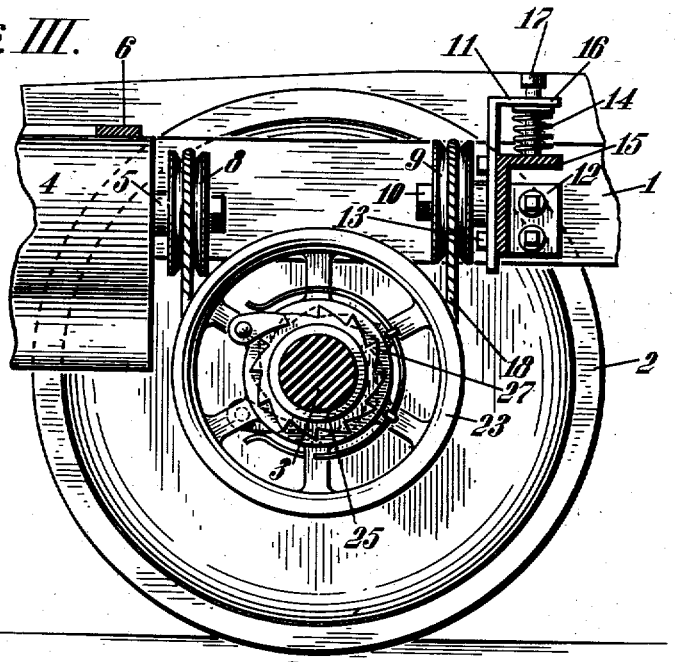
Fig. IV.
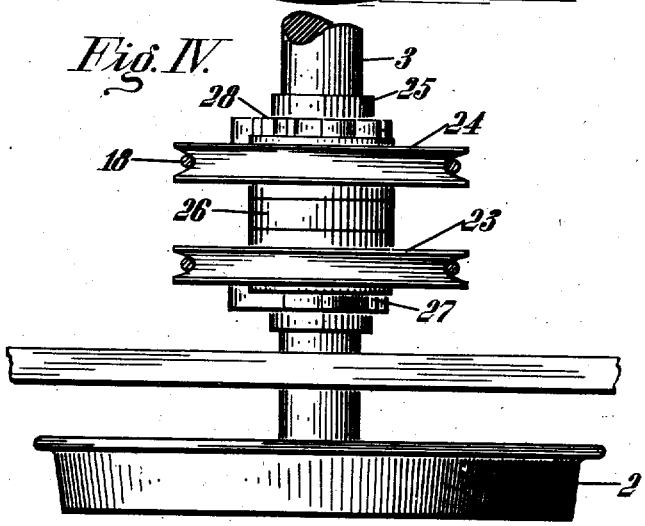
WITNESSES:
Lindsley Schepmoes
Conrad Kramp
INVENTOR:
John L. Creveling
By
Kennison, Crim, Earley & Co.
His attorneys

UNITED STATES PATENT OFFICE.

JOHN L. CREVELING, OF NEW YORK, N. Y., ASSIGNOR TO THE SAFETY CAR HEATING AND LIGHTING COMPANY, A CORPORATION OF NEW JERSEY.

MEANS FOR DRIVING DYNAMOS FROM CAR-AXLES.

SPECIFICATION forming part of Reissued Letters Patent No. 11,961, dated January 21, 1902.

Original No. 637,766, dated November 28, 1899. Application for reissue filed September 23, 1901. Serial No. 76,320.

*To all whom it may concern:*

Be it known that I, JOHN L. CREVELING, of New York, in the county of New York, State of New York, have invented certain new and useful Improvements in Means for Driving Dynamos Placed Upon Car-Trucks by Power Taken from the Axles, of which the following is a complete specification, reference being had to the accompanying drawings.

The object of my invention is to provide means for driving a dynamo by power from a car-axle in the use of which the mechanism is practically operative under all conditions, and the armature-shaft of the dynamo extends endwise of the car, making it possible to draw out the armature, if necessary, without taking down the dynamo or removing the truck from under the car.

My invention belongs to that class of apparatus in which a belt is employed to communicate power from the axle to the armature-shaft; and it consists, in part, in providing means for utilizing an endless belt without having it pass around the car-axle, whereby the employment of a splice in the belt is avoided.

My invention is also designed to avoid the use of a pole-changer in circuit with the dynamo by compelling, through the employment of a single belt, the rotation of the armature in the same direction regardless of the direction of rotation of the car-axle.

In the accompanying drawings, Figure I is a sectional view of a portion of a car-truck, illustrating a dynamo and mechanism for operatively uniting it to the axle. Fig. II is a top plan view of a portion of a car-truck, illustrative of the subject-matter shown in Fig. I. Fig. III is a view similar to Fig. I, showing means for causing, in connection with a single belt, the rotation of the armature in one direction regardless of the direction of rotation of the axle. Fig. IV is a top plan view of a portion of the subject-matter of Fig. III.

Referring to the figures on the drawings, 1 represents a car-truck, 2 a pair of wheels, and 3 an axle which carries them. The car-truck and its axle may be of any ordinary or suitable variety and are illustrated only as one of the many types of truck to which my machine is applicable.

4 indicates a dynamo whose armature-shaft 5 is disposed endwise of the car—that is to say, at right angles to the axle 3. The dynamo is supported by the bracket 6 in proximity to the end of the car-truck and in such a manner that its armature may be easily drawn out at the end of the truck. The brushes and commutator may be placed in position to facilitate their inspection—as, for example, in a box 7 at the end of the car-truck. Secured to the end of the armature-shaft 5 I provide a sheave 8 and preferably opposite to it an idler 9, which being carried upon a stud 10, projecting from a slotted frame 11, that is secured to a bracket-support 12, as by bolts 13, working in its slot, is adapted to be actuated by a spring 14, set between angle-arms 15 and 16 on the bracket 12 and frame 11, respectively. The idler 9, although defined as carried upon a stud 10, is essentially only separated from the sheave 8 and its shaft and may be mounted in any way which will provide a clear space between those two parts for the passage of the belt.

17 indicates an abutment-screw for regulating the stress of the spring 14.

An endless belt 18, passing around the sheave 8 and idler 9, respectively, derives power from the axle 3 through intermediate sheaves secured to the axle. In the form of embodiment of my invention illustrated in Figs. I and II, 19 indicates one of said driving-sheaves, which is split and fixedly clamped upon a split bushing 20 around the axle, so as to revolve with the axle and to transmit power from it. One bend of the belt 18 works in the sheave 19, while the opposite bend thereof works in a loose sheave 21, revolving upon the bushing 20, as between rings 22, secured to the bushing.

From the foregoing description it will appear that the belt 18 may be applied in practice to the sheaves 8, 9, 19, and 21 without the necessity of passing it around the car-axle. Consequently the belt may be applied without taking the wheels from the truck. This affords facility for applying or replacing the belt. Moreover, the belt may be made without a splice or joint, which in a belt traveling at a high rate of speed over small pulleys it is important to avoid. The belt, as illustrated, is a round belt, which may be made of wire, manila rope, or leather; but a flat belt may be substituted for the round belt, if preferred.

It may be observed that through the employment of the arrangement of sheaves illustrated and the endless belt through which they are operatively united a good arc of contact both with the armature-sheave 8 and the driving-sheave 19 is secured. The extent of the arc of contact may be augmented by locating the idler 9 on the same side of the axle 3 as the sheave 8 instead of upon the opposite side.

In Figs. III and IV, I illustrate as carried by the axle 3 sheaves 23 and 24, suitably mounted, as upon a sleeve 25, with an intermediate spacing-ring 26. Through the aid, for example, of suitable pawl-and-ratchet mechanism 27 and 28, provided upon the respective sheaves and the sleeve 25, each sheave is adapted to be driven by the rotation of the axle in one direction and to revolve loose upon it in the other direction, the sheaves being adapted to be driven, respectively, by the rotation of the axle in the opposite directions. By this means the armature-shaft 5 is always rotated in the same direction regardless of the direction of the rotation of the car-axle, thereby avoiding the necessity of the use of a pole-changer in circuit with the dynamo.

In practice the pawls illustrated in Figs. III and IV are preferably made quite heavy, so that when the axle is revolving at considerable speed centrifugal force will cause the one not engaged to stand clear of its ratchet, thereby avoiding unnecessary noise and wear.

It is not my intention to limit myself to the details of construction hereinbefore illustrated and described. The elements illustrated in the drawings and referred to in the specification are selected as well adapted for the purpose of driving a dynamo by power taken from a car-axle through the employment of a single endless belt.

The employment of a single endless belt for the purpose of transmitting power is a main feature of my invention, to which the special means described for operatively applying the belt is subordinate, and the means of applying the belt may be widely varied in practice within the scope of my invention.

What I claim is—

1. The combination with a truck and rotatory axle, of a fixed and movable sheave upon the axle, a dynamo and armature-shaft, a fixed sheave upon the armature-shaft, an idler pivotally supported so as to leave a clear space between it and the said fixed sheave, and an endless belt passing from the armature-sheave to the idler against the axle-sheave, and in operative contact with each sheave substantially as set forth.

2. The combination with a truck and rotatory axle, of a fixed and a movable sheave upon the axle, a dynamo whose armature-shaft is disposed endwise of the truck, a fixed sheave upon the armature-shaft, a stud-supported idler, and an endless belt passing from the armature-sheave to the idler against the axle-sheaves, and in operative contact with each sheave, substantially as set forth.

3. The combination with a truck and rotatory axle, of a fixed and movable sheave upon the axle, a dynamo whose armature-shaft is provided with a fixed sheave located upon one side of the axle-sheave, a spring-actuated idler pivotally supported upon one side only, and an endless belt passing from the armature-shaft to the idler against the axle-sheaves, and in operative contact with each sheave, substantially as set forth.

4. The combination of a truck and a rotating member deriving its rotary motion from the movement of the truck, a suitably-supported dynamo traveling with the truck and a single belt transmitting power from the rotating member to the armature-shaft and an idler coöperating with the said belt all arranged so that an endless belt may be directly applied to the apparatus without the necessity of opening or splicing the belt, to effect such application.

5. The combination of a dynamo, a rotating member deriving its movement of rotation from the motion of the car, an idler supported at one side only and a single belt for imparting motion from the rotating member to the dynamo-shaft and the idler.

6. The combination of a truck, a rotary driving-gear deriving its motion of rotation from the movement of the truck, a pulley driving a dynamo, a single endless belt engaging the driving means and pulley, and an additional belt-engaging means so mounted and arranged that the endless belt may be passed thereover and engaged with the pulley and driving-gear in position for operation.

7. The combination of a truck, a rotating member driven by the movement of the truck and comprising in its structure a plurality of pulleys, a dynamo, a pulley adapted to drive the said dynamo and an idler, the dynamo-driving pulley being unsupported at one side and the idler being also unsupported at one side whereby a single endless driving-belt may be passed around the four pulleys without the necessity of splicing the belt.

8. The combination of a truck, a dynamo supported to travel with the truck, a shaft receiving its rotary motion by the movement of the truck, a pulley receiving motion from the said shaft and driving the dymano and means whereby a single, endless driving-belt may be placed about the shaft and around the pulley.

9. In a driving-gear for dynamos, the combination of a shaft having a plurality of pulleys in driving relation therewith, a plurality of separate pulleys supported from one side only of each pulley, and a single endless belt engaging with each of the pulleys.

JOHN L. CREVELING.

Witnesses:
F. E. KESSINGER,
GEO. E. MORSE.